US00RE41537E

(19) United States
(12) Reissued Patent
Chu et al.

(10) Patent Number: US RE41,537 E
(45) Date of Reissued Patent: Aug. 17, 2010

(54) CITRUS PEEL JUICE

(75) Inventors: Osvaldo A. Chu, Sarasota, FL (US); Yongsoo Chung, Palatine, IL (US); Thomas Sanders, Azusa, CA (US); D. Scott Lineback, Crystal Lake, IL (US)

(73) Assignee: Tropicana Products, Inc., Bradenton, FL (US)

(21) Appl. No.: 12/395,938

(22) Filed: Mar. 2, 2009

Related U.S. Patent Documents

Reissue of:
(64) Patent No.: 7,485,332
Issued: Feb. 3, 2009
Appl. No.: 11/170,232
Filed: Jun. 29, 2005

U.S. Applications:

(63) Continuation-in-part of application No. 10/234,611, filed on Sep. 4, 2002, now Pat. No. 7,108,887, which is a continuation-in-part of application No. 09/556,577, filed on Apr. 24, 2000, now Pat. No. 6,544,577, which is a continuation-in-part of application No. 09/209,161, filed on Dec. 10, 1998, now Pat. No. 6,054,168.

(51) Int. Cl.
*A23L 2/06* (2006.01)

(52) U.S. Cl. ..... 426/616; 426/425; 426/472; 426/478; 426/481; 426/489; 426/599

(58) Field of Classification Search ..... 426/72, 426/73, 74, 658, 648, 425, 472, 478, 489, 426/599, 616
See application file for complete search history.

(56) References Cited

U.S. PATENT DOCUMENTS 2,215,944 A * 9/1940 Vincent
RE22,865 E * 4/1947 Vincent
3,165,415 A * 1/1965 Kilburn, et al.
3,347,678 A * 10/1967 Villadsen et al.
3,801,717 A * 4/1974 Huffman
4,016,351 A * 4/1977 Eschinasi
4,297,220 A * 10/1981 Meitzner et al.
4,313,372 A * 2/1982 Gerow et al.

(Continued)

FOREIGN PATENT DOCUMENTS

WO WO 01/87092 * 11/2001
WO WO 01/87097 * 11/2001

OTHER PUBLICATIONS

Shaw, P. et al., "Commercial Debittering Processes to Upgrade Quality of Citrus Juice Products", In Citrus Limonoids, 2000.*

LaFlamme and Weinand, "New Developments Using the Combination of Membrane Firltration and Adsorption Technology", (German language), Journal Article ISSN: 0015–4539, *FSTA & VITIS IFIS Publishing*, 1997.*

Najim, et al., "Effects of Orange Juice Fortification with Thiols on p–Vinylguaiaco Formation, Ascorbic–Acid Degradation, Browning, and Acceptance during Pasteurization and Storage under Moderate Conditions", J. Agric. Food Chem. 1997, 45, 1861–1867.*

(Continued)

*Primary Examiner*—Helen F Pratt
(74) *Attorney, Agent, or Firm*—Banner & Witcoff, Ltd.

(57) ABSTRACT

Byproduct from extracting citrus juice from whole fruit is made into a slurry and extracted to provide a rudimentary peel juice. This is processed into a raw peel juice and microfiltered to prepare a clarified raw peel juice. The peel juice is processed to remove naturally occurring components which detract from the quality of the fruit juice. Such components are removed by contacting the peel juice with an adsorptive [rein] *resin* in order to provide an enhanced peel citrus juice, which can be blended with other juices.

29 Claims, 3 Drawing Sheets

U.S. PATENT DOCUMENTS

| | | | | | |
|---|---|---|---|---|---|
| 4,413,017 | A | * | 11/1983 | Loader | |
| 4,439,458 | A | * | 3/1984 | Puri | |
| 4,477,481 | A | * | 10/1984 | Eisenhardt, Jr. et al. | |
| 4,497,838 | A | * | 2/1985 | Bonnell | |
| 4,514,427 | A | * | 4/1985 | Mitchell et al. | |
| 4,522,836 | A | * | 6/1985 | Dechow et al. | |
| 4,608,266 | A | * | 8/1986 | Epperson et al. | |
| 4,643,902 | A | * | 2/1987 | Lawhon et al. | |
| 4,666,721 | A | * | 5/1987 | Norman et al. | |
| 4,921,709 | A | * | 5/1990 | Sole | 426/49 |
| 4,959,237 | A | * | 9/1990 | Walker | |
| 4,965,083 | A | * | 10/1990 | Norman et al. | |
| 5,202,142 | A | * | 4/1993 | Gresch | |
| 5,403,604 | A | * | 4/1995 | Black, Jr. et al. | |
| 5,411,755 | A | * | 5/1995 | Downton et al. | |
| 5,734,046 | A | * | 3/1998 | Ifuku et al. | |
| 5,773,075 | A | * | 6/1998 | Todd | |
| 5,817,354 | A | * | 10/1998 | Mozaffar et al. | |
| 5,885,638 | A | * | 3/1999 | Takayanagi et al. | |
| 5,965,177 | A | * | 10/1999 | Lashkajani | |
| 6,013,304 | A | * | 1/2000 | Todd | |
| 6,045,842 | A | * | 4/2000 | Mozaffar et al. | |
| 6,054,168 | A | * | 4/2000 | Lioutas et al. | |
| 6,534,107 | B1 | * | 3/2003 | Ma et al. | |
| 6,544,577 | B1 | * | 4/2003 | Chu et al. | |

OTHER PUBLICATIONS

Milnes, B. and Agman, G, Debittering and Upgrading Citrus Juice and By–Products using Combined Technology, Proceedings of Citrus Processing Short Course, 1995.*

LaFlamme an Weinand, "New Development by the Combination of Membrane Filtration and Adsorption Technology", Fruit Processing, 1993.*

Nagy, Chen and Shaw, Fruit Juice Processing Technology, 1993.*

Hernandez et al., "Evaluation of Ultrafiltration and Adsorption to Debitter Grapefruit. . . ", Journal of Food Science, vol. 57, No. 3, 1992, pp. 664–444, 670.*

MacGregor and Schofield, Alimentech Debittering (and allied) Processeses, Proceedings of Citrus Processing Resource Management and Technology Short Course, 1991.*

Wethern, "Debittering with Ultrafiltration/Adsorption Combined Technology", Citrus Engineering Conference Transactions, 1991.*

Norman, "Juice Enhancement by Ion Exchange and Adsorbent Technologies", In Production and Packaging of Non–Carbonated Fruit Juice and Fruit Beverages, 1990.*

Kimball and Norman, "Processing Effects during Commercial Debittering of California Navel Orange Juice", J. Agric. Food Chem. 1990, 38, 1396–1400.*

Manlan, et al., "Evaluation of the Properties of Polystyrene Divinylbenzene Adsorbents for Debittering Grapefruit Juice", Journal of Food Science, vol. 55, No. 2, 440–445, 1990.*

Norman and Kimball, "A Commercial Citrus Debittering Systems", ASME 35, pp. 1–30, 1990.*

Johnson and Chandler, "Adsorptive Removal of Bitter Principles and Titratable Acid from Citrus Juices", Food Technology, May 1988.*

Johnson and Chandler, "Ion Exchange and Adsorbent Resins for Removal of Acids and Bitter Principles from Citrus Juices". J. Sci. Food Agric. 1985, 36, 480–484.

Wethern, "Citrus Debittering With Ultrafiltration/Adsorption combined Technology", ASME 37, pp. 48–66, 191.

* cited by examiner

CITRUS PEEL JUICE

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of application Ser. No. 10/234,611, filed Sep. 4, 2002, now U.S. Pat. No. 7,108,887 which is a continuation-in-part of application Ser. No. 09/556,577, filed Apr. 24, 2000, now U.S. Pat. No. 6,544,577, which is a continuation-in-part of application Ser. No. 09/209,161, filed Dec. 10, 1998, now U.S. Pat. No. 6,054,168, each hereby incorporated herein by reference.

FIELD OF THE INVENTION

The invention generally relates to citrus-originating products and processes for making them. More particularly, the invention extracts and refines citrus juice from citrus peel materials which are byproducts of extracting juice from whole citrus fruit. Citrus peel materials are combined with water and subjected to extraction to provide a raw citrus peel juice source, which then is microfiltered. The resulting permeate is subjected to treatment with an adsorptive resin which reduces levels of less desirable components, including traditionally recognized bitterants such as naringin and limonin along with other juice components which are susceptible to adsorption by such resins and which otherwise detract from the quality of the juice products. This provides a refined peel juice.

BACKGROUND OF THE INVENTION

Citrus fruits have long been recognized as valuable sources of important nutrients. More recently, health benefits and disease retarding or treating benefits of citrus sources have come to be more fully recognized as advantageous and beneficial when ingested. Accordingly, there is a general belief that increasing the intake of citrus-originating foods is a beneficial and important objective in the overall scheme of human health.

One potential source of citrus juice solids is the large volume of citrus peel material which traditionally has been used in low value applications such as livestock feed. Many tons of citrus peel material are collected as byproduct each citrus harvesting season when juice is extracted from whole citrus fruit by commercial extraction equipment from FMC Corporation, Brown AME and others. Such citrus fruits including orange, grapefruit, tangerine and lemon fruits. In terms of volume of juice extracted and citrus peel byproduct material collected, orange-originating products present both the greatest challenge for higher value use and the most promising potential for economic advantage. Heretofore, these peel material resources have been underutilized due to negative characteristics of peels, which characteristics can be considered objectionable on a very wide scale.

Certain approaches have been taken in the past in an effort to process citrus extraction peel byproduct material into products which have a value that is high than use as livestock feed. Once such approach is that of Bonnell U.S. Pat. No. 4,497,838. This shows a process for recovering "useful" products from orange peels through use of a countercurrent solvent extraction that is carried out with a non-aqueous solvent such as an alcohol. An aqueous extract is collected which contains most of the sugars, essential oils and bioflavanoids from the citrus peel byproduct. A sugar syrup product is said to be produced, as well as an "orange flower" solid product which in high in cellulose and pectin.

Other approaches, such as shown in U.S. Pat. No. Re. 22,865 and No. 2,215,944 (Boscawen), set forth a process in which water is added to ground peel and the resulting mixture is passed through a press. While a press liquor is recovered, the peel is subjected to hydroxy treatment to form a gel, which is treated with an acid in order to form pulpy solids. These are separated in order to collect the solids for the food product of these patents. The focus of this product is use as animal feed.

Other peel extraction approaches have been suggested. Eschinasi U.S. Pat. No. 4,016,351 shows extracting juice from peel by adding water and calcium to peel prior to pressing the peel in order to form a press cake that is the product of this patent. Calcium is removed with an oxalic acid solution. Gerow U.S. Pat. No. 4,313,372 shows wet pulp/peel being mixed with dilute press liquor and pressed to limit additional press liquor. The wet peel is treated with super heated steam, the material is mixed with lime, and the press cake is dried for collection.

Prior suggested approaches such as these tend to emphasize solvent extraction to form derivative products. Such products are not of a nature to be considered as a citrus juice in its own right. They do not truly recover additional levels of valuable sugar and nutrient sources from byproduct destined for low-grade livestock feed and transform same into a juice product suitable for human consumption. There is accordingly a need for approaches which allow a more complete realization of the potential of citrus fruits, and especially of peel byproduct from citrus fruit juice extraction.

While membrane filtration approaches are generally known for operating upon citrus juice sources with a view toward preparing a variety of different products and byproducts, these approaches typically do not substantially change the characteristics of a citrus peel juice.

In addition, removal of components from citrus sources through the use of an ion exchange resin is generally known and used in debittering or deacidifing traditional citrus juice sources. For example, Mitchell et al. U.S. Pat. No. 4,514,427 notes that bitter narigin and limonin can be removed from citrus juices by contacting the juice with a weak base anionic exchange resin having a matrix of a styrene polymer and functional groups derived from a monoamine or a polyamine. Puri U.S. Pat. No. 4,439,458 describes reducing flavonoid and/or limonoid induced bitterness in citrus fruit juices through adsorption of such bitterness componets by a resin. This patent notes that naringin is a typical flavonoid, that limonin is a typical limonoid, and that the resin can be a styrene divinylbenzene cross-linked co-polymer. Norman et al. U.S. Pat. No. 4,965,083 has a general teaching along these lines, and this patent discloses a post-crosslinked adsorbent resin.

Divinylbenzene adsorptive resins are disclosed in Meitzner et al. U.S. Pat. No. 4,297,220, in Ifuku et al. U.S. Pat. No. 5,734,046, and in Takayanagi et al. U.S. Pat. No. 5,885,638. Mozaffar et al. U.S. Pat. No. 5,817,354 specifically teaches the use of Rohm and Haas AMBERLITE® XAD-16 styrene divinylbenzene resin to adsorb, and thus remove from citrus juices, bitterness compounds such as limonoids, including limonin, nomilin and other compounds, and flavonoids such as narigin and hesperidin. In general, the art recognizes that adsorptive resins such as AMBERLITE® XAD-16 of Rohm and Haas are useful for removing flavonoids and limonoids from citrus juices.

The subject matter of each patent or publication mentioned herein is incorporated by reference hereinto. For example, the chemical structure of the styrene divinylbenzene resins is disclosed in the thus incorporated patented or published subject matter.

As noted generally herein, historically citrus fruit peel byproduct is not used in a high value manner, and many valuable nutrients are not put to use in a manner which directly benefits people. There is accordingly a need for approaches which allow a more complete realization of the potential of citrus fruit peel components. The present invention addresses this need by combining peel Brix and nutrient extraction with microfiltration and debittering so as to provide a peel-originating citrus juice having sensory properties suitable for human use.

Fruit juices of interest include those for use in juice products which are concentrated and which can be reconstituted before distribution to the consumer or thereafter. These so-called "from-concentrate" juices undergo an evaporation or concentration procedure. The invention also is of value for use in providing citrus juices which are consumed without ever being concentrated or subjected to an evaporation process. These can be referred to as "not-from-concentrate" citrus juices.

The juice products which can be prepared according to the invention include filler juices as well as stand-alone juices. Many blended juice products are currently marketed. Most such products include as a primary component what has come to be known as "filler" juice. A filler juice is a relatively inexpensive juice source which is suitable for blending with other juices or juice flavors. Primary filler juices have been apple juice and/or grape juice, particularly white grape juice. These traditional types of filler juices are generally considerably lower in nutritional content than are the peel-originating citrus juices according to the invention. The use of citrus sources as filler juices has developed by technology such as in U.S. Pat. No. 6,054,168. Ideal filler juices are relatively low in cost and have a relatively bland flavor.

Accordingly, there is a need for citrus juices originating from peel byproduct sources which are themselves improved by removing naturally present components which have negative effects on juice products as processed and/or after packaging and storage, while making nutrients and Brix solids available in a form very suitable for human consumption.

SUMMARY OF THE INVENTION

In accordance with the present invention, citrus fruit peel byproduct sources are processed into unique peel juice products which retain the positive nutritional and Brix benefits of the peel while also being relatively low in bitterness attributes, and which can exhibit a clarity attribute suitable for juices including filler juices. Peel juice is extracted with water and physical processing, followed by microfiltration and by contacting with adsorptive resin. The resulting products are entirely natural. The nutrients present in the fruit peel source are effectively retained in the products.

It is accordingly a general aspect and object of the present invention to provide improved processes which transform citrus peel byproducts into citrus juice products for human consumption.

Another aspect or object is to recover soluble solids and/or sugar lost in traditional citrus juice extraction.

Another aspect or object of the present invention is to provide improved citrus fruit processing and products which improve the overall yield and/or utilization of citrus fruit sources by extracting valuable components from citrus peel and pulp byproduct from citrus juice extraction.

Another aspect or object of this invention is to provide improved citrus juice products which originate from peel and which are incorporated into food and beverage products without adding undesirable bitterness flavor or sensory notes.

Another aspect or object of the present invention is to provide citrus juice products which had been extracted from peel, had been microfiltered, and had been subjected to the adsorptive properties of a styrene bivinylbenzene resin.

Other aspects, objects and advantages of the present invention will be understood from the following description according to the preferred embodiments of the present invention, specifically including stated and unstated combinations of the various features which are described herein, relevant information concerning which is shown in the accompanying drawing.

BRIEF DESCRIPTION OF THE DRAWINGS

In the course of this description, reference will be made to the attached drawings, wherein.

DETAILED DESCRIPTION OF PREFERRED EMBODIMENTS

Figure 1:
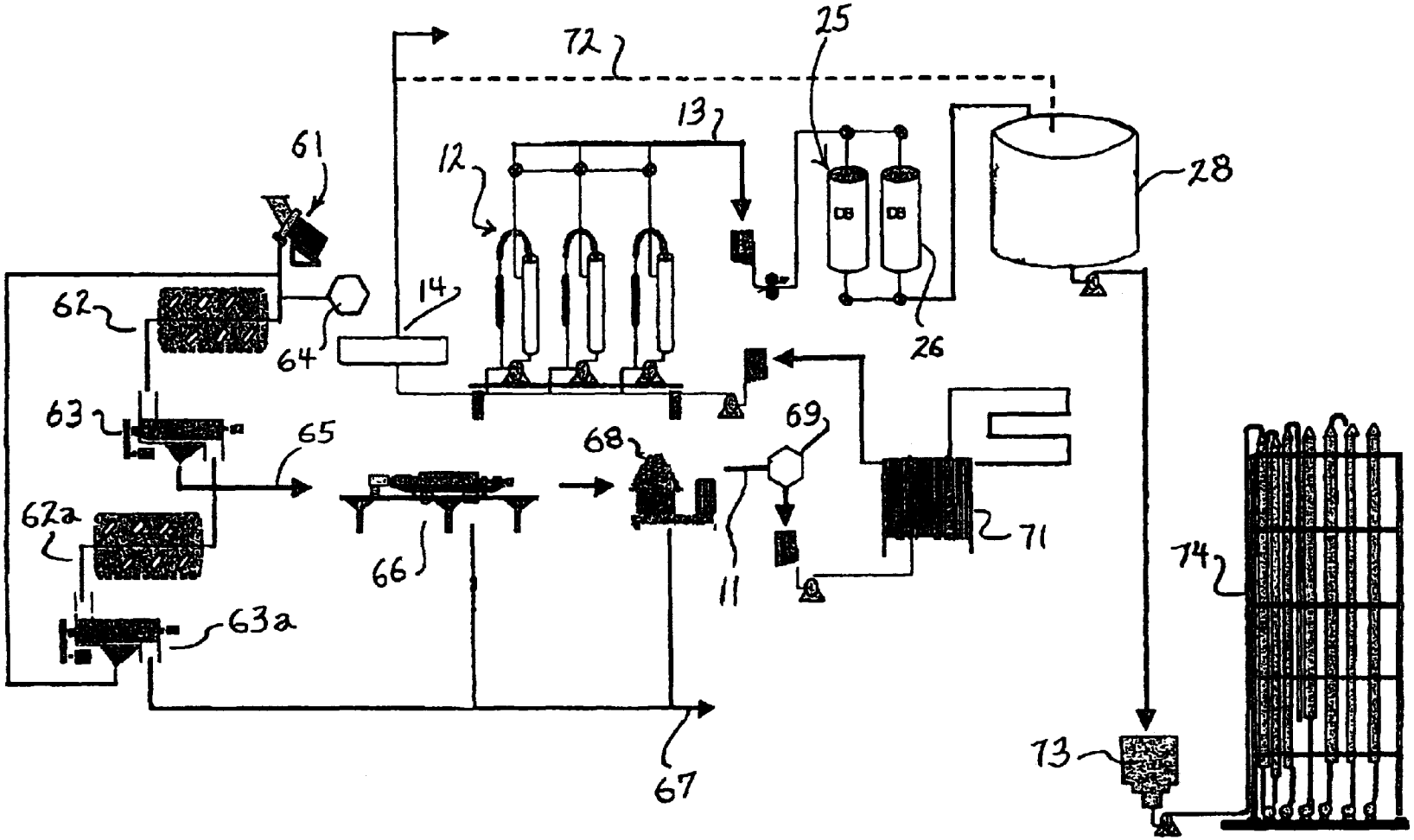
FIG. 1 is a schematic representation of an embodiment of the invention which can be used in preparing a peel juice product.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

The present invention is directed toward fruit products and processes, especially to citrus fruit originating byproducts and processes for making them into viable citrus juices. Citrus fruits include grapefruit, orange, tangerine and lemon fruits. The invention is well suited for use with grapefruit and orange sources and their low value byproduct sources, particularly the peel and pulp byproduct from extraction of juice with industrial-scale juice extractors, which by product either is discarded or put to low-value use such as livestock feed or fertilizer.

The invention successfully addresses concerns regarding perceived negative attributes of citrus byproduct-originating products. The principles of this invention also are applicable to byproducts from citrus fruit sources, more specifically to juice extracted from the peel and pulp fractions of citrus fruits. When such sources are orange sources, the primary bitterant to be contended with is limonin. When such sources are grapefruit sources, the traditionally recognized primary citrus bitterant is naringin, a flavonoid. So-called peel juices with reduced negative attributes such as these are provided.

The invention successfully addresses concerns regarding perceived negative attributes of juice products. The principles of this invention are especially applicable to citrus juice extracted from the peel and pulp fractions of citrus fruits. The resulting refined citrus juice is transferred from a byproduct very unacceptable for human use to a citrus juice product for use as a filler juice, a juice source for blending, a juice source for concentrating, or a stand-alone juice. This is perhaps best suited for use as a filler or blending juice.

One of the benefits of the invention is the removal of limonin and naringin. Other components which are removed or reduced in quantity within citrus sources according to the invention are other limonoids such as nomolin and the like. Such components include other flavonoids such as the flavones hesperidin (typically in orange juice at 350-7000 mg/liter), hesperidin glucoside, narirutin (typically in orange juice at 18-65 mg/liter) narirutin glucoside and the like. Also included are carotenoids and polyphenolic compounds such as para-vinylguaiacol (PVG). In relatively small quantities, methoxylated flavones such as noviletin, sinesetin, heptamethoxyflavone and tangeretin are present in orange juice as polyphenolic compounds which are addressed by the present invention.

The basic approach of the process includes extracting valuable materials from citrus peel through a continuous washing/pressing system, which then is processed through a combination of centrifuge or other separation means, microfiltration, and adsorbent resin systems. The result is a refined and clarified peel juice that can be formulated into a finished juice. Often, the refined and clarified peel juice is concentrated by an evaporator of known construction and operation. In many instances, the processed and clarified peel juice, whether concentrated or not, is formulated into a finished product with properties with a stand-alone juice.

The process extracts the natural sugars, nutrients, oils, flavor and color components present in the citrus peel and transforms them into a value-added juice source. The peel juice is upgraded by removing bitter and undesirable components in order to produce a juice with the flavor and nutritional properties required for a stand-alone citrus juice. After extracting these valuable components from the citrus juice extraction byproduct, the peel solids residue from which the valuable components have been stripped still is suitable for manufacturing animal feed or as a feed stock for pectin extraction.

Orange peel cups and byproduct residue including pulp and other residue left after extraction and which is collected from a typical industrial-scale citrus juice extraction process (at times referred to herein as "peel byproduct") are shredded as an initial step in the process according to the invention. The orange peel cups and residue can be from citrus sources, including oranges, particularly including Hamlin round oranges and Valencia round oranges which are widely used in the Florida citrus juice extraction industry.

With reference to FIG. 1, a peel shredder, generally designated at 61, reduces the byproduct from juice extraction into smaller peel pieces of approximately 3/16 inch to 3/4 inch, typically on the order of 3/8 inch. A typical shredder includes grinder, cutter and/or hammermill units to accomplish the shredding. The resulting shredded peel is passed to a mixing device 62 for combining the shredded peel with water. The ratio of shredded peel to water typically ranges between about 1:2 and about 2:1, preferably between about 0.5:1 to about 2:1. The contacting provided by the mixing typically proceeds for on the order of 15 to 30 minutes. The resulting slurry typically will pass to a finisher 63 in order to remove particulate material. A further mixer and finisher combination can be provided in order to effect a serial mixing and finishing so as to further refine the material and collect nutrients in addition to those extracted and separated through operation of the first mixer and finisher. As illustrated, recirculation can take place. A rudimentary peel juice is thus provided.

The peel cups entering the shredder 61 will have a pH on the order of approximately 5. An injector 64 preferably is provided in order to add a food grade acid such as citric acid or other edible acid into the water and shredded peel, thereby reducing the pH to on the order of about 3.5 to 4.0 slurry. This assists in extraction of the valuable components from the peel while also adjusting the pH to a level more suitable for a citrus juice product. A typical pH range at outflow location 65 will be on the order of about 3.5 to about 4.0. In this illustrated embodiment, the rudimentary peel juice from outflow location 65 passes through a separator 66 such as a decanter centrifuge, in order to achieve reduction of suspended solids.

The yield of soluble solids extracted from the peel within the mixer and finisher can be increased by raising the temperature of the water above ambient temperature, typically not greater than about 120° F. (about 50° C.). After the washing step, the slurry is pressed to remove the peel solids from the juice. Separators include screen finishers, decanters, screw presses, belt presses or a combination of these systems.

Peel solids residue exits the separator for collection at 67 and transfer to a suitable location, such as a feed mill. The decanted peel juice preferably passes to an oil reduction unit 68 in order to adjust the oil content of the peel juice at this location. At this stage, a raw peel juice is provided at juice source location 11.

The raw peel juice typically has a soluble solids content to provide a Brix of between about 4° and about 8°. Preferably, the raw peel juice is pasteurized at this stage. Optionally, an enzyme maybe added at a suitable addition location 69 which is prior to pasteurization. Enzyme treatment is useful in breaking down juice components to provide a positive effect. Typically this closely precedes heat treatment in a pasteurizer 71 by an approach that is typical for a citrus juice and under conditions generally known in the art. Pasteurization is followed by microfiltration and adsorbent resin treatment, generally as follows.

A typical enzyme is pectinase, added at a very mild concentration, such as on the order of between about 20 ppm and about 30 ppm (or milligrams per liter). Typically, this is present within the raw peel juice for about 15 to about 30 minutes and at a temperature of about 80° F. (about 27° C.). Such an enzyme treatment is useful in breaking down pectin and to function as a processing aid. With further reference to FIG. 1, the pasteurized citrus peel juice 11 next is subjected to microfiltration and debittering. Raw peel juice 11 will have a level of natural bitterant(s) and/or off-flavor compounds which vary with the originating fruit. These generally are flavonoids, terpenes, limonoids, polymethoxylated flavones and phenolic compounds. Typical ranges are between about 500 ppm and about 1200 ppm of the flavonoid naringin for traditional grapefruit sources and about 5 ppm to about 100 ppm of the limonoid limonin for traditional orange sources. Supply 11 also will have a naturally occurring acidity level, typically primarily citric acid for citrus juices, of between about 0.70 weight percent to about 1.20 weight percent of the raw peel citrus juice.

The raw peel juice source 11 flows into a separation unit 12. Typically unit 12 will be a membrane filtration unit such as one that incorporates an ultra filtration membrane and/or a microfiltration membrane. A typical ultra filtration membrane of this type will have a minimum pore size of about 30 Angstroms, which generally equates to a Molecular Weight Cut Off (MWCO) of about 2000. A typical ultra filtration membrane maximum pore size is about 1000 Angstroms (0.1 micron), which generally equates to 100,000 MWCO. A typical microfiltration membrane of this type will have a pore size range of between about 0.1 micron and about 1.0 micron, preferably between about 0.3 micron and about 0.7 micron.

Separation unit 12 separates the flow from the raw peel juice source 11 into a permeate which moves into a transfer member 13 and a retentate which moves into a transfer member 14. This permeate continues to have a Brix level, a bitterant level, an off-flavor level and an acidity level approximating those of the raw peel juice 11. It is substantially devoid of any pulp or clouding solids. The retentate from separation unit 12 is a byproduct of the juice processing hereof. This retentate retains virtually all of the natural solids or pulp material. This retentate can be generally referred to as citrus pulp solids. It also has the Brix level, bitterant level and acidity level which approximate or are greater than those of the raw peel juice 11. This retentate byproduct contains the suspended solids such as proteins and fibers and high molecular weight carbohydrates such as pectins associated with cloud.

Figure 2:
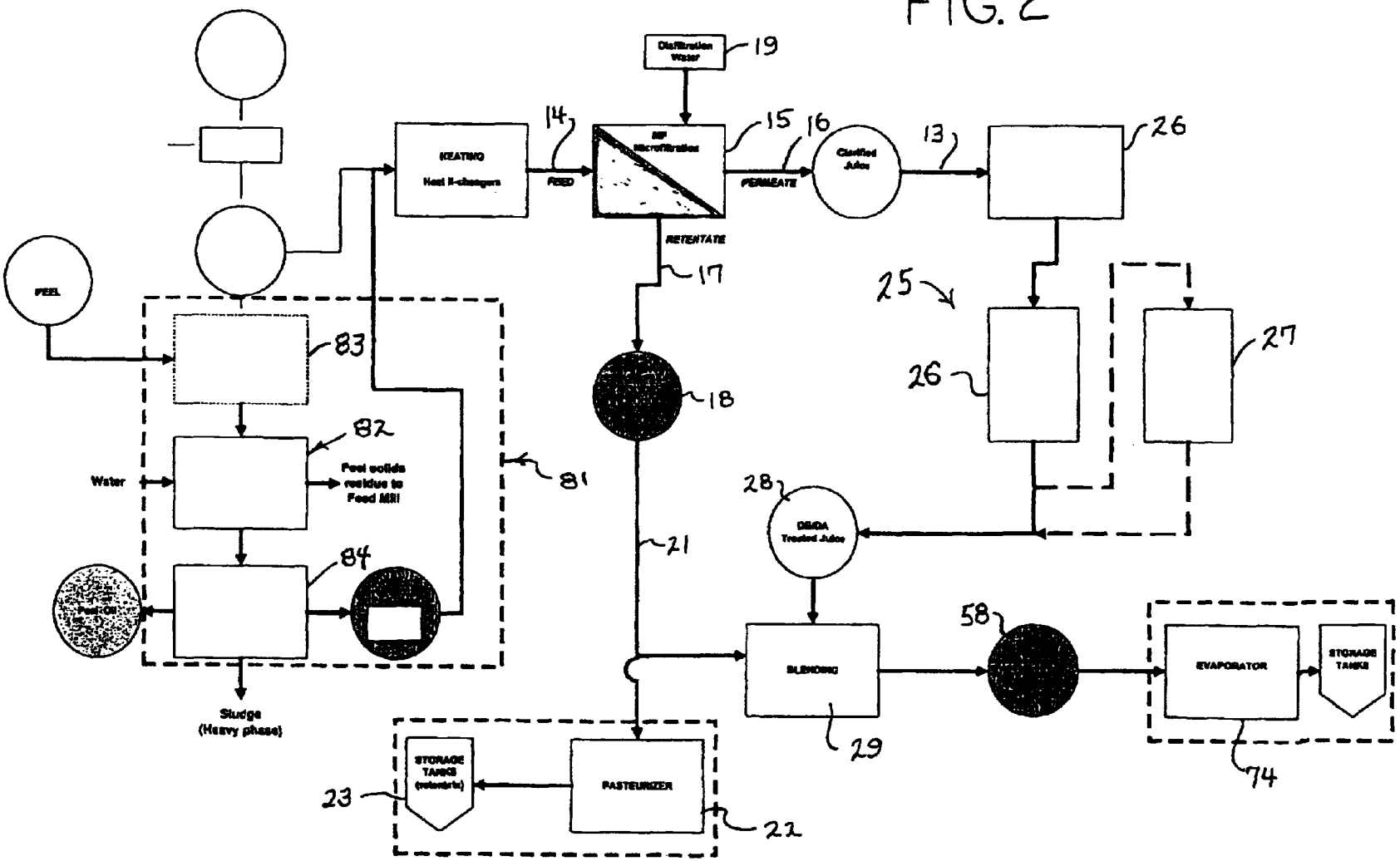
FIG. 2 is a schematic representation of another embodiment.

The system which is illustrated in FIG. 2 shows optional treatment of the pulp material by which a diafiltration unit 15 receives the pulp retentate from the transfer member 14. As is generally known in the art, a diafiltration unit accomplishes filtration through the use of a washing system which applies a liquid from wash source 19 to the filtration media. Such an approach allows soluble components within the pulp retentate to be dissolved so as to pass through the filtration media, while the pulp solids collect as a diafiltration retentate. Diafiltration is especially useful for recovering sugar solids if a filtrate is to be used in juice products. Diafiltration helps remove additional bitterants.

In an illustrated arrangement, between approximately 75% and 90% of the soluble components find their way into the diafiltration permeate and to transfer member 16 as a clarified peel juice. Most of the following components find their way into the diafiltration permeate when this diafiltration is practiced on citrus sources: naringin, limonin, other bitterants, other flavonoids, limonoids, polymethoxylated flavones, phenolics, sugars, acids, vitamins and nutrients including vitamin C, minerals and so forth. Conversely, only between about 5% and 25% of these same components remain in the diafiltration retentate byproduct, which passes to a transfer member 17, and to a receptacle 18 in this embodiment which is illustrated in FIG. 2. As noted in FIG. 2, this retentate can be included in material passing to the evaporator when a concentrate is to be prepared. Such can assist in retarding browning of the peel juice, especially during evaporation.

It has been found that this byproduct can be used as an additive, such a through transfer member 21, for juice products. As such an additive, it provides an all-natural bland clouding agent which has been found to be instrumental in providing visual cues which allow a consumer to identify the juice source, even for a juice which has a very low bitterant level and has a reduced acidity level.

Depending upon the relative amount of water within the all-natural bland clouding agent byproduct prepared when diafiltration is practiced, it may be desired to reduce its water level in order to provide a somewhat more concentrated clouding agent. Typically, the water concentration of the pulpy retentate byproduct at area 18 is approximately 80 to 90 weight percent or less. In this instance, the all-natural bland clouding agent can move from area 18 to a separation apparatus which is suitable for separating liquids and solids. A typical separation apparatus is a filter press. Other options include a centrifuge, a decanter, or a vibrating press. It can include traditional crossflow filtration filters or devices using vibrating filter technology. Passage of the all-natural bland clouding agent byproduct material through such a separation apparatus forms a pulp wash byproduct and an all-natural bland concentrated pulp or clouding agent, typically having a water content of approximately 70 to 80 weight percent or less. This concentrated byproduct has properties similar to the all-natural bland clouding agent material 18, as adjusted by the reduced water level. If desired, this could be added to a juice product. Whatever pulp product is provided, it can be pasteurized at 22 and stored at 23.

With further reference to FIG. 1, the permeate from separation unit 12 flows from the transfer member 13 to the resin treatment section 25. With reference to FIG. 2, the separated juice serum flows as a clarified juice through the transfer member 13 for resin processing at a resin treatment section 25. If desired, cooling can be carried out at 26 by cooling heat exchangers or the like before flow to the resin treatment section 25. This flow contains substantially all of the nutrients and other components from the flow into the diafiltration unit, when provided as illustrated in FIG. 2.

In FIG. 1 and FIG. 2, at Section 25, one or more columns 26, which contain resin(s) generally known as debittering resins, are included. This results in substantial reduction of naturally occurring compounds as discussed herein. Typically, adsorption resins are used in section 26. Commercial adsorption systems are available for use in section 26. They are styrene divinylbenzene resins. Preferred is AMBERLITE® XAD-16 resin from Rohm and Haas. Others are Alimentech 470, 495 and P685 resins, and Optipore SD-2 and L285 resins.

The shipping weight of XAD-16 is 0.71 gram/ml, 20 grams of this resin fill 28.1 milliliters, and 200 milliliters of juice volume correspond to 7.1 bed volumes of this resin, while 400 milliliters of juice volume correspond to 14.2 bed volumes, 600 milliliters corresponding to 21.3 bed volumes, and so forth. Alimentech 470 has a shipping weight of 0.68 gram/ml, and 20 grams of this resin take up 29.4 milliliters, with 200 milliliters of juice volume corresponding to 6.8 bed volumes of this resin, 400 milliliters corresponding to 13.6 bed volumes, 600 milliliters corresponding to 20.4 bed volumes, and so forth. The shipping weight of Alimentech 495 is 0.73 gram/ml, and 20 grams of this resin take up 27.4 milliliters, with 200 milliliters of juice volume corresponding to 7.3 bed volumes for this resin, 400 milliliters corresponding to 14.6 bed volumes, 600 milliliters corresponding to 21.9 bed volumes, and so forth. The shipping weight of Optipore SD-2 is 0.67 gram/ml, and 20 grams of this resin take up 29.9 milliliters, with 200 milliliters corresponding to 6.7 bed volumes for this resin, 400 milliliters corresponding to 13.4 bed volumes, 600 milliliters corresponding to 20.1 bed volumes, and so forth. The shipping weight of Optipore L285 is 0.64 gram/ml, and 20 grams of this resin take up 31.2 milliliters, with 200 milliliters corresponding to 12.8 bed volumes, 600 milliliters corresponding to 19.2 bed volumes, and so forth.

Section 26 removes from citrus juice sources flavonoids such as naringin which is the predominant flavanone glycoside that naturally occurs in grapefruit. Compounds falling within the limonoids group which are found in citrus fruits, including limonin and nomilin, also are removed by this resin. Other bitterant agents can be removed here. The non-bitterant flavanone hesperidin glycoside, which is predominant in orange and tangerine citrus fruits, is removed from such sources by this resin in section 26. All of these types of components and others noted herein are substantially reduced according to the invention.

With particular reference to grapefruit originating peel juice, when a substantial quantity of the naringin content is removed, the result is a grapefruit juice which is substantially less bitter than grapefruit juice which is not thus processed. When the naringin level is especially substantially reduced, it can be difficult to identify the resultant juice materials as grapefruit originating. It will be appreciated that varying naringin levels can be selected; for example, between about 20 ppm and about 20 ppm naringin can remain. For many products, the naringin level will be between about 50 ppm and 150 ppm. An especially bland or debittered grapefruit peel juice product which is suitable for use as a clear filler juice—which may be recognized as grapefruit juice (when the naringin level is about 200 ppm, typically not greater than this level) when tasted alone—has a naringin level of between about 80 ppm and about 180 ppm, often not greater than about 120 ppm. This can be generally referred to as a clear filler peel juice.

It will be appreciated that the acidity of the peel juice source 11 can be reduced. In these instances, the section 25 includes one or more deacidification columns 27 (FIG. 2) and receives clarified peel juice flow such as from a debittering column 26. Deacidification equipment represented by column 27 is generally known. It has the ability to significantly reduce the acid content of fruit juices. Peel juice sources can have a natural acidity which exceeds desired levels. A typical acidity content of the peel juice after passage through column 27 and into a receptacle 28 will be between about 0.3 and about 0.9 weight percent. A typical range is between about 0.4 and about 0.8 weight percent acid, typically as citric acid.

Acidity also can play a role in identifying a juice as a particular citrus juice. For example, as recognized in U.S. Pat. No. 6,054,168, when it is desired to detect grapefruit-originating juice as a grapefruit juice, it is often desirable to have an acidity level generally between about 0.4 and about 0.8 weight percent. It has been found that maintaining this acidity level, which can be augmented by adding a relatively minor amount (for example as low as about 2 weight percent) of the all-natural bland clouding agent byproduct, results in the recongnizability of the juice product as a grapefruit juice product, but without any of the negative flavor notes which have come to be associated with naringin in grapefruit juice.

Whether the peel juice is only debittered or is both debittered and deacidified, it passes out of the section 25 and into a suitable receptacle 28. When thus fully processed, this can be referred to as clarified, debittered and deacidified peel juice.

Typically, adsorption resins are used in section 25. Commercial adsorption systems which are available include systems incorporating ion exchange resins such as cationic polystyrene adsorbent resins, cationic acrylic adsorbent resins, polyamide resins, anionic polystyrene copolymers which release chloride groups, basic anionic polystyrene resins having quaternary ammonium active groups, and other suitable resins or other adsorbents which are known and available in the art for use in these types of systems. Examples of adsorbents and ion exchange resins for debittering and/or deacidification are found in U.S. Pat. Nos. 4,297,220, 4,439,458, 4,514,427 and 5,817,354, each incorporated hereinto by reference.

Referring now to FIG. 2, with this embodiment, some or all of the all-natural bland clouding agent byproduct is added to the clear peel juice from transfer member 21 or storage tank 23. If desired, this addition can be made within a receptacle or blending tank 29.

The cloudy peel juice product at 58 is useful as a cloudy filler juice or as a cloudy stand-alone juice. When the latter originates from a grapefruit peel source, it is a unique grapefruit juice product which is easily recognized as a grapefruit juice while avoiding what a segment of the population finds objectionable in unprocessed grapefruit juice, especially naringin content and also acidity, while still maintaining virtually the same level of pulp within the grapefruit juice.

Generally speaking, in order for a juice to be properly labeled in accordance with governmental regulations, it must be organoleptically recognizable or identifiable as that juice. Typically, taste tests are instrumental in determining whether or not a juice is recognized as the particular juice, such as grapefruit juice. For example, a clear filler peel juice having a naringin level in the 120 ppm range (or in some cases lower) and an acidity in the 0.8 weight percent range (or in some cases lower) and a Brix value in the range of 10° Brix, may not be recognized as grapefruit juice by a majority of taste panelists, whereas adding the all-natural bland clouding agent to this formulation at a level of at least about 5 weight percent, based upon the total weight of the filler peel juice, results in a cloudy filler peel juice which is organoleptically identifiable as grapefruit juice.

Embodiments can refrain from using the diafiltration process features and equipment mentioned herein in order to carry out solids reduction prior to resin treatment. For example, such can be omitted when the source of raw peel juice is of a type that undesirable solids can be removed by centrifugation techniques and/or other filtration techniques. After processing such as through an adsorption resin, additional components can be added. These include the retentate components which can supply an add-back of suspended solids such as pulp or cloud as discussed herein or the retentate through an add-back loop 72 (FIG. 1). Others include flavor components such as flavor add-backs for balancing oils and other flavor components, usually to restore sensory attributes lost during processing. Natural flavor add-back systems are preferred for blending with the clarified and debittered peel juice.

When a peel juice concentrate is to be prepared, the clarified and debittered peel juice is subjected to concentration in accordance with principles generally known in the art. The not-from-concentrate peel juice which enters chamber 73 flows into a conventional evaporator 74 in order to concentrate the peel juice, typically to provide a finished concentrated peel juice having a Brix from about 40° to about 50°.

FIG. 2 schematically illustrates a separation system 81 which includes a press system 82. In this illustrated embodiment, the press system 82 is preceded by enzyme treatment at 83 and is followed by a centrifuge 84. This illustrates an embodiment of a separator assembly such as separator 66 of FIG. 1.

Figure 3:
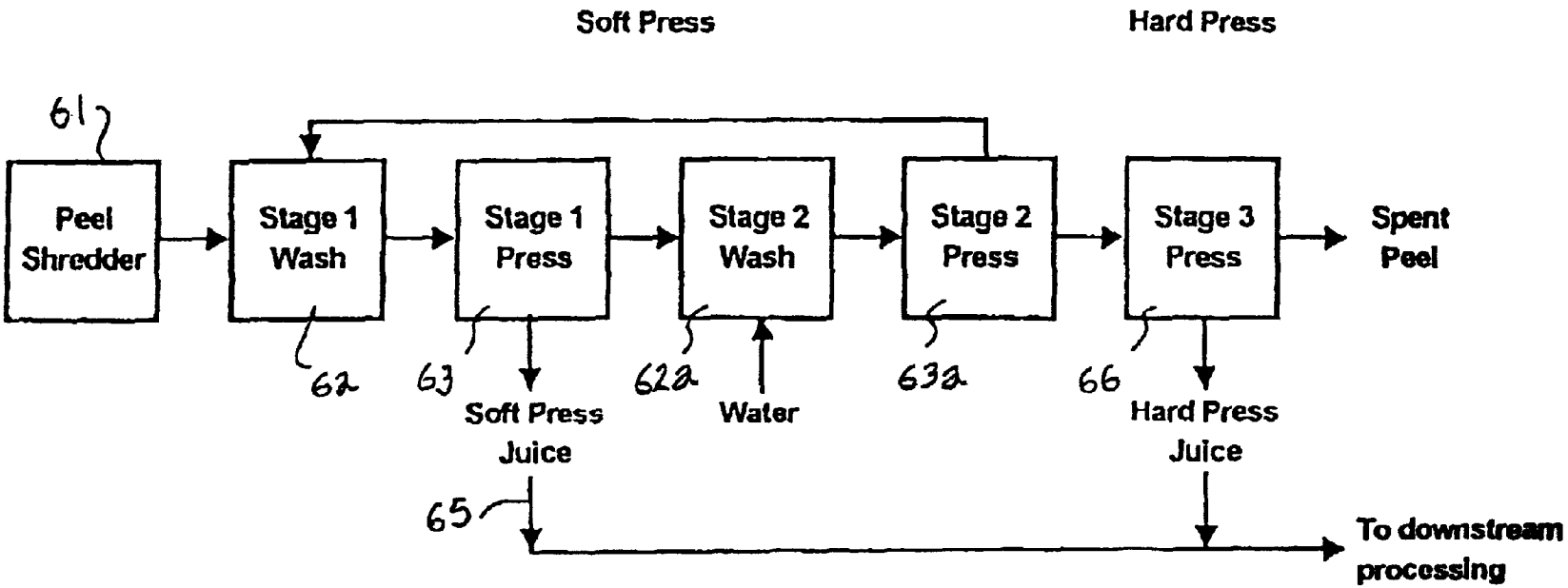
FIG. 3 is a schematic flow diagram of an embodiment of an extraction procedure according to the invention.

FIG. 3 provides further details of a specific embodiment for the press system 82. This illustrates a multiple-stage approach for extracting the valuable components from the slurry. This also finds correspondence in the separation system of FIG. 1. With this approach, multiple washes and pressings are carried out on the slurry. In this arrangement, both the stage 1 press and the stage 2 press are in the nature of a soft press, which refers to presses having separation techniques and/or conditions that are relatively non-aggressive. The stage 3 press in this embodiment is a so-called hard press, which imparts aggressive separation action on the slurry in preparing the rudimentary peel juice. It has been found that the soft press approach produces a peel juice having orange sensory characteristics more in line with traditionally extracted orange juice, while exhibiting greater positive notes than peel juice extracted by means of a hard press. Also, the soft press prepared peel juice is cleaner and lighter than peel juice extracted with a hard press.

The aggressiveness of presses or separators will vary. A hard press of the VP type is more aggressive than other hard presses, such as of the BP type. The former hard presses extract peel juices which have strong peel sensory notes and exhibit lingering bitterness.

By proceeding with the multi-stage approach, the extraction carried out when the slurry or rudimentary peel juice has a large degree of potentially negative solids is with a soft press, thereby reducing the negative notes and components which make their way into the peel juice prepared by soft press extraction. A soft press can employ centrifugal force to effect separation. The effectiveness of the separation by any one stage is off-set by proceeding with multiple stages of slurry or rudimentary peel juice that have gradually reduced levels of the negative components. This multiple stage extraction is useful in enhancing the yield of raw peel juice during the separation stages. Thus, the slurry flowing from the stage 1 press 63 is subjected to a second stage washing in the mixer 62a, and the slurry moving into the second stage press 63a is reduced in negative components when compared with the slurry entering the first stage press 63. Preferably, some of the juice from the second stage press is recycled for further washing and pressing by being transported to the first stage mixer 62. By suitable control approaches, rudimentary peel juice from the second stage press can flow into the third stage press 66. Because this third stage press operates on juices from which substantial quantities of negative components already have been removed, hard pressing can be carried out in an aggressive manner characteristic of such a hard press without great concern for negative components making their way into the raw peel juice which goes to downstream processing.

Illustrations of the disclosure herein are provided in the following Examples.

EXAMPLE 1

Orange peel cups collected from a juice extraction process were shredded into pieces ranging in size between approximately 3/16 inch and ¾ inch. The shredded peel was contacted with water for 15 to 30 minutes at a peel-to-water ratio on the order of 1:1.

The resulting slurry was pressed to remove the peel solids from the slurry. The thus prepared rudimentary peel juice was at a Brix level of between 4° and 8°. The juice phase was centrifuged to provide a raw peel juice which was pasteurized, followed by membrane filtration in order to clarify the peel juice.

The clarified peel juice was passed through a debittering column of AMBERLITE® XAD-16 adsorbent resin system. The resin system removed flavonoids, phenolic compounds and bitter limonoids. The thus processed peel juice had improved flavor characteristics. This processed orange peel juice is suitable for combining with traditionally extracted orange juice to provide an orange juice product having good sensory attributes and taste characteristics with a volume ratio of 30:70 of processed peel juice to traditionally extracted orange juice.

EXAMPLE 2

Orange peel material was pulled from the discharge of a commercial AME (Brown®) citrus juice extractor running mid-sized fruit of about 2 to 3 inches in diameter. The peel was Hammermill® pulverized into a puffy uniform consistency and blended with water at a ratio of 1:1. An enzyme blend of Rapidase® and Cytolase® was added to this slurry, with the enzyme assisting in breaking down of pectin cells.

The slurry then was passed to a Graver® tube press unit for separation purposes. The Brix of the permeate juice-like substance was between 9.0° and 10.0° for this peel juice product.

The peel juice was passed through MPF36 and MPF44 membranes in a Koch FC-3 cell using a nitrogen gas pressure source. The juice was at 100° F. (37.8° C.). The pH of the feed was 3.26, while that of the permeate was 3.35. This peel juice is improved by contacting it with an adsorption resin to reduce the levels of flavone glucosides or flavones such as narirutin, hesperidin glucoside, naringin glucoside, polyphenolic compounds, and compounds associated with browning including the polyphenol para-vinylguaiacol.

The resulting processed orange peel juice is suitably combined with traditionally extracted orange juice. It is combined at a volume ratio of 20:80 processed orange peel juice to traditionally extracted orange juice and evaporated into a concentrate juice product.

EXAMPLE 3

Orange peels were shredded into pieces no larger than about ¾ inch. The smaller peel pieces were combined with water at water/peel ratios of 0.5/1 to 2.5/1. The water/peel slurry was pressed to separate the peel solids from the peel liquor (rudimentary juice). The raw peel liquor was centrifuged to separate out a peel oil fraction and a sludge heavy phase from a peel juice having a Brix of about 4° to 8°, with a total solids of about 4 to 10 weight percent. This raw peel juice was processed through a membrane filtration system, and diafiltration was carried out as part of the membrane filtration. The primary bitterants removed into the serum or clarified peel juice at this stage include limonin, citrus flavonoids, and polyphenolic compounds. The serum was treated with AMBERLITE® XAD-16 styrene divinylbenzene resin to reduce the quantity of limonin, citrus flavonoid and polyphenolic compounds in the serum. The serum was colleated as a processed orange peel juice and blended with traditional from-concentrate orange juice at a level of about 20 percent by weight of the serum to make up an orange juice having sensory characteristics generally in line with the from-concentrate juice.

EXAMPLE 4

Orange peel juice having a Brix of 3.65° was contacted with XAD-1600 resin and subjected to spectrophotometer analysis for polyphenols at 325 nm. The control was at 2.274. The blank (auto zero) was at 0.192. The readings after different bed volumes of treatment were as follows: 1 bed volume, −0.030; 5 bed volumes, 0.479; 10 bed volumes, 0.885; 15 bed volumes, 1.075; 20 bed volumes, 1.212; 25 bed volumes, 1.401; and 30 bed volumes, 1.367. The following composite bed volume readings were made: 1-10 composite, 0.556; 1-15 composite, 0.803; 1-20 composite, 0.914; and 1-30 composite, 0.953.

EXAMPLE 5

Orange peel juice was contacted with AMBERLITE® XAD-16 or XAD-1600 resin and subjected to spectrophotometer readings for polyphenols. A 0.5 liter column was used. Tropicana PURE PREMIUM® orange juice was subjected to spectrophotometer analysis for polyphenols at 345 nm. At full strength (12.38° Brix), the reading was 0.793. At 0.75 concentration (9.44° Brix), the reading was 0.577. At half concentration (6.05° Brix), the reading was 0.401. At 0.25 concentration (3.35° Brix), the reading was 0.326.

For the orange peel juice run through the XAD-1600 column, the polyphenol 325 nm reading was 0.227 for the blank (auto zero) and 2.076 for the control. After 5 bed volumes, this value was 0.841. After 10 bed volumes, this value was 1.091. After 15 bed volumes, this value was 1.145. The 1-10 bed volumes composite was at 0.883, and the 1-15 bed volumes composite was at 0.753.

For the XAD-16, the 325 nm polyphenol reading was 0.231 for the blank (auto zero) and 2.397 for the control. After 5 bed volumes, the reading was 0.834; after 10 bed volumes, 1.29; after 15 bed volumes, 1.304; after 20 bed volumes, 1.374; after 25 bed volumes, 1.640; and after 30 bed volumes, 1.723. For a 1-10 bed volumes composite, the 325 nm reading was 0.718. For a 1-15 bed volumes composite, the 325 nm reading was 1.082. For a 1-20 bed volumes composite, the 325 nm reading was 1.098, and for 1-30 composite, the reading was 1.270.

Some readings also were taken at 420 nm for detecting off-flavor, off-taste, darkening color precursors. These data are reported in Table I.

TABLE I

| XAD 16 | Reading at 420 nm | XAD 1600 | Reading at 420 nm |
|---|---|---|---|
| BV5 | 0.049 | BV5 | 0.029 |
| BV10 | 0.105 | BV10 | 0.035 |
| BV15 | 0.142 | BV15 | 0.056 |
| BV20 | 0.185 | BV20 | 0.034 |
| BV25 | 0.228 | BV25 | 0.055 |
| BV30 | 0.227 | BV30 | 0.059 |
| 1-10 Comp. | 0.155 | 1-10 Comp. | 0.029 |
| 1-15 Comp. | 0.090 | — | — |
| 1-20 Comp. | 0.110 | 1-20 Comp. | 0.026 |
| 1-30 Comp. | 0.154 | 1-30 Comp. | 0.037 |
| Control | 0.543 | Control | 0.442 |
| Blank | −0.010 (Auto Zero) | Blank | −0.001/0.001 |

EXAMPLE 6

Spectrophotometer readings were taken at 325 nm for polyphenolic compounds and at 420 nm for detecting off-flavor, off-taste, darkening color precursor components. These were taken on citrus sources which were not subjected to adsorption resin treatment and on citrus sources which were subjected to adsorption resin treatment. The former citrus sources were orange juice concentrate (OC) at six different Brix levels, orange pulp wash concentrate (PW) at six different Brix levels, Tropicana PURE PREMIUM® orange juice (PP) at five Brix levels, and an Australian peel extract (APE). The latter citrus sources were orange peel juice and from-concentrate orange juice run through XAD-16 resin and XAD-1600 resin columns. Each had different levels of retentate add-back.

Data are reported in Table II. In this Table, the peel juice run through XAD-16 with 4% retentate add-back is identified as 16-4. The peel juice run through XAD-16 with 20% retentate add-back is designated 16-20. The peel juice run through XAD 1600 with 4% retentate add-back is designated 00-4. The peel juice run through XAD-1600 with 20% retentate add-back is designated 00-20. The from-concentrate orange juice which was run through XAD-16 with 4% retentate add-back is designated C16-4. From-concentrate orange juice was treated with XAD-16 resin, with a 20% high cook retentate add-back. This is identified as C16-20. From-concentrate orange juice run through XAD-16 with 20% of a less cooked retentate add-back is identified as C16-20'. The from-concentrate orange juice was also run through XAD-1600 resin, with a 20% retentate add-back. This is designated C00-20. The "x2" indicator in Table II signifies double the stated quantity for these samples which were diluted to half strength because reading at 325 nm showed best accuracy below 2.5. Thus, the last PW reading of 1.464(x2) means that the reading at 325 nm was 2.928.

TABLE II

| Sample | Brix(°) | Reading at 325 nm | Reading at 420 nm |
|---|---|---|---|
| OC | 4 | 0.320 | 0.073 |
| OC | 6 | 0.541 | 0.108 |
| OC | 8 | 0.665 | 0.140 |
| OC | 10 | 0.886 | 0.184 |
| OC | 12 | 1.026 | 0.219 |
| OC | 14 | 1.273 | 0.267 |
| PW | 4 | 0.682 | 0.094 |
| PW | 6 | 1.183 | 0.168 |
| PW | 8 | 1.583 | 0.239 |
| PW | 10 | 1.976 | 0.321 |
| PW | 12 | 2.350 | 0.408 |
| PW | 14 | 1.464 (x2) | 0.487 |
| PP | 3.23 | 0.219 | 0.049 |
| PP | 6.47 | 0.491 | 0.085 |
| PP | 9.36 | 0.716 | 0.113 |
| PP | 12.33 | 0.950 | 0.165 |
| Blank | — | 0.073 | 0.005 |
| Blank | — | 0.077 | 0.011 |
| APE | 11.54 | 1.390 (x2) | 0.773 |
| 16-4 | 3.34 | 0.791 | 0.034 |
| 16-20 | 3.29 | 1.158 | 0.050 |
| 00-4 | 3.20 | 0.908 | 0.010 |
| 00-20 | 3.21 | 1.121 | 0.025 |
| C16-4 | 12.03 | 1.5972 (x2) | 0.823 |
| C16-20 | 11.56 | 2.121 (x2) | 1.290 |
| C16-20' | 10.35 | 1.880 (x2) | 0.771 |
| C00-20 | 11.99 | 1.990 (x2) | 0.467 |

EXAMPLE 7

Orange peel juice was prepared from peel discharge of commercial juice extractors. This provided a feed peel juice having a Brix of 8.75° and an acidity of 0.24, with a pH of 4.18 and a total solids of 11.90 weight percent. This feed was centrifuged to provide a juice phase having a Brix of 8.72°, an acidity of 0.23, a pH of 4.16, and a solids content of 10.53 weight percent. No limonin was detected.

The thus prepared juice phase was passed through a 0.5 micrometer microfiltration unit. The retentate at the filter had a Brix of 10.92°, an acidity of 0.25 weight percent, a pH of 4.18, a Vitamin C content of 1.69 mg/100 ml, and a total solids content of 13.13 weight percent. The thus-prepared peel juice permeate had a Brix of 7.64°, and an acidity of 0.20 weight percent, a pH of 4.15, a Vitamin C content of 6.81 mg/100 ml, and a total solids content of 8.43 weight percent.

This peel juice permeate was then run through a column of AMBERLITE® XAD-16 resin to prepare a peel juice having a Brix of 7.41°, an acidity of 0.16, a pH of 4.57, a Vitamin C content of 34.10 mg/100 ml, an oil content of 0.020 weight percent, and a limonin content of 16.0 ppm.

Another run on the centrifuging and microfiltration equipment prepared a microfiltered citrus peel juice permeate having a Brix of 4.50°, an acidity of 0.11 weight percent, a pH of 4.32, oil at 0.002 weight percent, a Vitamin C level of 5.65 mg/100 ml, a limonin content of 1.1 ppm, and a hesperidin content of 131 ppm. After centrifugation, but prior to microfiltration, the juice source had no detected limonin and a hesperidin content of 319 ppm.

In other runs, juice prepared from orange peel collected from juice extractors manufactured by FMC was analyzed to have a Brix of 10.56°, an acidity of 0.18 weight percent, a pH of 4.52, an oil content of 3.52 weight percent, and a hesperidin content of 1419 ppm, with no Vitamin C or limonin being detected. This was compared with peel juice made from peels from oranges processed through a Brown® extractor manufactured by AME. The peel juice from this source, before passage through any resin column, had a Brix of 5.39°, an acidity of 0.10 weight percent, a pH of 5.04, an oil content of 3.94 weight percent, and a hesperidin content of 1031 ppm, no Vitamin C or limonine being detected.

EXAMPLE 8

Orange peel juice was prepared from peels discarded by commercial orange juice extractors. The peels were shredded and pressed, solids were separated, and the resulting raw juice was subjected to microfiltration and passage through XAD-16 resin. Analyses were made for determining flavanoids and limonoids. Other samples were submitted for analysis concerning carotenoids and flavanoids. The peel juices were at a typical single-strength level, namely 11.8° Brix. Concerning the limonoids, contents of the following were measured: nomolin, limonin, and an estimate of total liminoids. The flavanoid compounds measured were: narirutin, naringin, hesperidin, neohesperidin (hespridin glucoside), naringenin and hesperitin. The polymethoxylated flavones were: sinensetin, heptamethoxyflavone, nobiletin and tangeretin.

EXAMPLE 9

Raw peel juice prepared from Hamlin orange peels as generally discussed herein was pasteurized. The peel juice was analyzed and the following average values were reported: limonoids, 584 ppm; hesperidin, 746 ppm; sinensetin, 32 ppm; nobiletin, 20 ppm; heptamethoxyflavone, 18 ppm; and tangeritin, 3 ppm. Samples of this peel juice which had been run through XAD-16 resin were analyzed in the same manner, and none of these components was detected in that resin-treated peel juice.

EXAMPLE 10

Orange peel juice was prepared from peels discarded by commercial orange juice extractors. The peels were shredded and pressed, solids were separated, and the resulting raw peel juice was subjected to filtration and passage through XAD-16 resin. In addition, the juice was pasteurized. Prior to passage through the resin, the Brix was 3.75, the acidity was 0.14 weight percent, the limonin content was 8.42 ppm, the hesperidin content was 154 ppm, the PVG content was 2.05 ppm, linalool was 4.57 ppm, alpha-terpineol content was 2.47 ppm, and the 4-vinylphenol content was 0.15 ppm.

After the resin was used through 24 bed volumes, the Brix was 3.64, the acidity was 0.13 weight percent, no limonin was detected, the hesperidin content was 6.09 ppm, the PVG content was 0.9 ppm, the linalool content was 1.43 ppm, the alpha-terpineol content was 2.87 ppm, and the 4-vinylphenol content was 0.07 ppm.

After the resin was used through 40 bed volumes, the Brix was 5.01, the acidity was 0.20 weight percent, no limonin was detected, the hesperidin content was 43.42 ppm, the PVG content was 2.84 ppm, the linalool content was 2.18 ppm, the alpha-terpineol content was 4.48 ppm, and the 4-vinylphenol content was 0.28 ppm.

After the resin was used through 1-24 bed volumes, the composite values were as follows: the Brix was 3.51, the acidity was 0.13 weight percent, no limonin was detected, the hesperidin content was less than 1 ppm, the PVG content was 0.33 ppm, the linalool content was 1 ppm, the alpha-terpineol content was 2.06 ppm, and the 4-vinylphenol content was 0.01 ppm.

After the resin was used through 1-40 bed volumes, the composite values were as follows: Brix was 3.92, the acidity was 0.16 weight percent, no limonin was detected, the hesperidin content was 5.96 ppm, the PVG content was 0.76 ppm, the linalool content was 1.29 ppm, the alpha-terpineol content was 2.75 ppm, and the 4-vinylphenol content was 0.05 ppm.

EXAMPLE 11

Orange peel juice was prepared from peels discarded by commercial orange juice extractors. The peels were shredded and pressed, solids were separated, and the resulting raw juice was subjected to filtration and passage through XAD-16 resin or through P685 resin. In addition, the juice was pasteurized.

Prior to passage through the XAD-16 resin, the Brix was 3.46, the acidity was 0.13 weight percent, the limonin content was 9.2 ppm, the hesperidin content was 153 ppm, the reading at 280 nm was 0.22, the reading at 325 nm was 1.94, the PVG content was 5.48 ppm, linalool content was 4.83 ppm, alpha-terpineol content was 2.59 ppm, and the 4-vinylphenol content was 0.54 ppm.

After the XAD-16 resin was used through 20 bed volumes, the Brix was 3.44, the acidity was 0.12 weight percent, no limonin was detected, no hesperidin was detected, the reading at 280 nm was 0.13, the reading at 325 ppm was 0.94, the PVG content was 6.48 ppm, linalool content was 0.57 ppm, alpha-terpineol content was 1.85 ppm, and the 4-vinylphenol content was 0.75 ppm.

After the XAD-16 resin was used through 40 bed volumes, the Brix was 3.55, the acidity was 0.13 weight percent, no limonin was detected, no hesperidin was detected, the reading at 280 nm was 0.30, the reading at 325 nm was 1.34, the PVG content was 6.86 ppm, linalool content was 0.92 ppm, alpha-terpineol content was 2.87 ppm, and the 4-vinylphenol content was 0.66 ppm.

After the XAD-16 resin was used through 1-40 bed volumes, the composite values were as follows: Brix was 3.44, the acidity was 0.12 weight percent, no limonin was detected, no hesperidin was detected, the reading at 280 nm was 0.22, the reading at 325 nm was 0.95, the PVG content was 0.60 ppm, the linalool content was 0.56 ppm, the alpha-terpineol content was 1.85 ppm, and the 4-vinylphenol content was 0.06 ppm.

Prior to passage through the P685 resin, the Brix was 3.67, the acidity was 0.13 weight percent, the limonin content was 9.2 ppm, the hesperidin content was 246 ppm, the reading at 280 nm was 0.34, and the reading at 325 nm was 1.88, and the PVG content was about the same as the feed into the XAD-16 resin.

After the P685 resin was used through 20 bed volumes, the Brix was 3.34, the acidity was 0.12 weight percent, no limonin was detected, no hesperidin was detected, the reading at 280 nm was 0.15, the reading at 325 ppm was 0.22, the PVG content was 0.10 ppm, linalool content was 0.09 ppm, alpha-terpineol content was 0.06 ppm, and no 4-vinylphenol was detected.

After the P685 resin was used through 40 bed volumes, the Brix was 3.51, the acidity was 0.13 weight percent, the limonin detected was less than 1 ppm, the hesperidin content was 75 ppm, the reading at 280 nm was 0.22, the reading at 325 nm was 0.83, the PVG content was 0.46 ppm, linalool content was 0.08 ppm, alpha-terpineol content was 0.04 ppm, and the 4-vinylphenol content was 0.04 ppm.

After the P685 resin was used through 1-40 bed volumes, the composite values were as follows: Brix was 3.34, the acidity was 0.11 weight percent, no limonin was detected, the hesperidin content was 23 ppm, the reading at 280 nm was 0.20, the reading at 325 nm was 0.29, the PVG content was 0.07 ppm, the linalool content was 0.05 ppm, no alpha-terpineol was detected, and no 4-vinylphenol was detected.

EXAMPLE 12

Orange peel juice was prepared from peels discarded by commercial orange juice extractors. The peels were shredded and pressed, solids were separated, and the resulting raw juice was subjected to filtration and passage through a resin bed of combined XAD-16 resin and P685 resin. The peel juice was not pasteurized. Prior to passage through the resin, the Brix was 4.58, the acidity was 0.23 weight percent, the limonin content was 1.52 ppm, the hesperidin content was 269.6 ppm, the PVG content was 5.82 ppm, linalool was 9.22 ppm, alpha-terpineol was 1.79 ppm, and the 4-vinylphenol content was 0.58 ppm.

After the resin was used through 14 bed volumes, the Brix was 4.31, the acidity was 0.24 weight percent, less than 1 ppm of limonin was detected, the hesperidin content was 42 ppm, the PVG content was 0.39 ppm, linalool content was 0.44 ppm, alpha-terpineol content was 0.12 ppm, and 4-vinylphenol content was 0.03 ppm.

After the resin was used through 1-15 bed volumes, the composite values were as follows: Brix was 4.17, the acidity was 0.17 weight percent, less than 1 ppm of limonin was detected, the hesperidin content was 31 ppm, the PVG content was 0.06 ppm, the linalool content was 0.18 ppm, the alpha-terpineol content was 0.04 ppm, and no 4-vinylphenol was detected.

EXAMPLE 13

Orange peel juice was prepared from peels discarded by commercial orange juice extractors. The peels were shredded and pressed, solids were separated, and the resulting raw peel juice was subjected to filtration and passage through a resin bed of combined Alimentech P495 resin and P685 resin. The peel juice was not pasteurized.

Prior to passage through the combined resin, the Brix was 4.85, the acidity was 0.23 weight percent, the limonin content was 1.93 ppm, the hesperidin content was 238.8 ppm, the PVG content was 5.67 ppm, the linalool content was 9.26 ppm, alpha-terpineol was 1.78 ppm, and the 4-vinylphenol content was 0.55 ppm.

After the combined resin was used through 15 bed volumes, the Brix was 4.34, the acidity was 0.24 weight percent, less than 1 ppm of limonin was detected, the hesperidin content was 69.03 ppm, the PVG content was 0.15 ppm, no linalool was detected, the alpha-terpineol content was 0.02 ppm, and no 4-vinylphenol was detected.

After the combined resin was used through 1-15 bed volumes, the composite values were as follows: Brix was 4.14, the acidity was 0.24 weight percent, less than 1 ppm of limonin was detected, the hesperidin content was 64.97 ppm, the PVG content was 0.02 ppm, no linalool was detected, the alpha-terpineol content was 0.02 ppm, and no 4-vinylphenol was detected.

EXAMPLE 14

Orange peel juice was prepared from peels discarded by commercial orange juice extractors. The peels were shredded and pressed, solids were separated, and the resulting raw peel juice was subjected to filtration and passage through XAD-16 resin. The juice was not pasteurized. Prior to passage through the resin, the Brix was 4.23, the acidity was 0.19 weight percent, the limonin content was 5.1 ppm, the hesperidin content was 291 ppm, the PVG content was 5.18 ppm, the linalool content was 3.88 ppm, the alpha-terpineol content was 1.54 ppm, and the 4-vinylphenol content was 0.40 ppm.

After the resin was used through 5 bed volumes, the Brix was 3.74, the acidity was 0.18 weight percent, no limonin was detected, no hesperidin was detected, the PVG content was 0.02 ppm, and no linalool, alpha-terpineol or 4-vinylphenol were detected.

After the resin was used through 15 bed volumes, the Brix was 3.67, the acidity was 0.19 weight percent, no limonin was detected, no hesperidin was detected, the PVG content was 0.03 ppm, and no linalool, alpha-terpineol or 4-vinylphenol were detected.

After the resin was used through 18 bed volumes, the Brix was 3.74, the acidity was 0.19 weight percent, no limonin was detected, no hesperidin was detected, the PVG content was 0.22 ppm, and no linalool, alpha-terpineol or 4-vinylphenol were detected.

After the resin was used through 1-21 bed volumes, the composite values were as follows: Brix was 3.65, the acidity was 0.18 weight percent, no limonin was detected, no hesperidin was detected, the PVG content was 0.08 ppm, and no linalool, alpha-terpineol or 4-vinylphenol were detected.

After the resin was used through 22-29 bed volumes, the composite values were as follows: Brix was 3.62, the acidity was 0.18 weight percent, no limonin was detected, no hesperidin was detected, the PVG content was 1.13 ppm, no linalool was detected, no alpha-terpineol was detected, and the 4-vinylphenol content was 0.24 ppm.

EXAMPLE 15

Orange peel juice was prepared from peels discarded by commercial orange juice extractors. The peels were shredded and pressed, solids were separated, and the resulting raw peel juice was subjected to microfiltration and passage of the permeate through Alimentech P685 resin. In addition, the juice was pasteurized.

Prior to passage through the resin, the Brix was 2.34, the acidity was 0.09 weight percent, the reading at 325 nm was 1.104 (adjusted to 10 Brix was 4.718), the limonin content was 13 ppm, the hesperidin content was 106 ppm, the PVG content was 0.46 ppm, the linalool content was 1.93 ppm, alpha-terpineol content was 0.97 ppm, and no 4-vinylphenol content was detected.

After the resin was used through 12 bed volumes, the Brix was 2.17, the reading at 325 nm was 0.011 (adjusted to 10 Brix was 0.051), no limonin was detected, no hesperidin was detected, the none of PVG, linalool, alpha-terpineol, or 4-vinylphenol were detected.

After the resin was used through 20 bed volumes, the Brix was 2.18, the reading at 325 nm was 0.068 (adjusted to 10

Brix was 0.312), no limonin was detected, no hesperidin was detected, and none of PVG, linalool, alpha-terpineol or 4-vinylphenol were detected.

After the resin was used through 25 bed volumes, the Brix was 2.17, the acidity reading was 0.08 weight percent, the reading at 325 nm was 0.087 (adjusted to 10 Brix was 0.401), no limonin was detected, no hesperidin was detected, and none of PVG, linalool, alpha-terpineol, or 4-vinylphenol were detected.

After the P685 resin was used through 1-25 bed volumes, the composite values were as follows: Brix was 2.17, the acidity reading was 0.10 weight percent, the reading at 325 nm was 0.027 (adjusted to Brix 10 was 0.124), no limonin was detected, no hesperidin was detected, and no PVG, linalool, alpha-terpineol or 4-vinylphenol were detected.

EXAMPLE 16

Orange peel juice was prepared from peels discarded by commercial orange juice extractors. The peels were shredded and pressed, solids were separated, and the resulting raw peel juice was subjected to microfiltration and passage of the permeate through Alimentech P685 resin. In addition, the juice was pasteurized.

Prior to passage through the resin, the Brix was 3.02, the acidity was 0.09 weight percent, the reading at 325 nm was 1.129 (adjusted to 10 Brix was 3.738), the limonin content was 13.5 ppm, the hesperidin content was 74 ppm, the PVG content was 0.27 ppm, the linalool content was 1.54 ppm, the alpha-terpineol content was 0.76 ppm, and no 4-vinylphenol content was detected.

After the resin was used through 12 bed volumes, the Brix was 2.06, the acidity was 0.07 weight percent, the reading at 325 nm was 0.003 (adjusted to 10 Brix was 0.014), no limonin was detected, no hesperidin was detected, and none of PVG, linalool, alpha-terpineol or 4-vinylphenol were detected.

After the resin was used through 25 bed volumes, the Brix was 2.14, acidity was 0.09, the reading at 325 nm was 0.027 (adjusted to 10 Brix was 0.126), no limonin was detected, no hesperidin was detected, and none of PVG, linalool, alpha-terpineol, or 4-vinylphenol were detected.

After the P685 resin was used through 1-25 bed volumes, the composite values were as follows: Brix was 2.06, the acidity was 0.08, the reading at 325 nm was 0.003 (adjusted to Brix 10 was 0.014), no limonin was detected, no hesperidin was detected, and no PVG, linalool, alpha-terpineol or 4-vinylphenol were detected.

EXAMPLE 17

Orange peel juice was prepared from peels discarded by commercial orange juice extractors. The peels were shredded and pressed, solids were separated, and the resulting raw peel juice was subjected to filtration and passage through Alimentech P495 resin. In addition, the juice was pasteurized.

Prior to passage through the resin, the Brix was 5.12, the acidity was 0.62 weight percent, the reading at 325 nm was 2.346 (adjusted to 10 Brix was 4.582), the limonin content was 22 ppm, the hesperidin content was 245 ppm, the PVG content was 11.02 ppm, the linalool content was 2.17 ppm, the alpha-terpineol content was 1.46 ppm, and the 4-vinylphenol content was 0.17 ppm.

After the resin was used through 1 bed volume, the Brix was 4.47, the acidity was 0.54 weight percent, the reading at 325 nm was 0.019 (adjusted to 10 Brix was 1.042), the PVG content was 0.02 ppm, the linalool content was 0.12 ppm, the alpha-terpineol content was 0.15 ppm, and no 4-vinylphenol was detected.

After the resin was used through 12 bed volumes, the Brix was 4.92, the reading at 325 nm was 0.930 (adjusted to 10 Brix was 1.890), the PVG content was 1.19 ppm, the linalool content was 0.17 ppm, the alpha-terpineol content was 0.34 ppm, and the 4-vinylphenol content was 0.05 ppm.

After the resin was used through 25 bed volumes, the Brix was 5.02, the reading at 325 nm was 1.668 (adjusted to 10 Brix was 3.362), no limonin was detected, the hesperidin content was 148 ppm, the PVG content was 4.35 ppm, the linalool content was 0.23 ppm, the alpha-terpineol content was 0.41 ppm, and the 4-vinylphenol content was 0.28 ppm.

After the resin was used through 1-25 bed volumes, the composite values were as follows: Brix was 4.91, the acidity was 0.61, the reading at 325 nm was 2.346 (adjusted to Brix 10 was 4.582), no limonin was detected, the hesperidin content was 107 ppm, the PVG content was 1.79 ppm, the linalool content was 0.18 ppm, the alpha-terpineol content was 0.30 ppm, and the 4-vinylphenol content was 0.08 ppm.

EXAMPLE 18

Orange peel juice was prepared from peels discarded by commercial orange juice extractors. The peels were shredded and pressed, solids were separated, and the resulting raw peel juice was subjected to filtration and passage through Alimentech P495 resin. In addition, the juice was pasteurized.

Prior to passage through the resin, the Brix was 5.10, the acidity was 0.62 weight percent, the reading at 325 nm was 1.776 (adjusted to 10 Brix was 3.482), the limonin content was 33 ppm, the hesperidin content was 181 ppm, the PVG content was 11.61 ppm, the linalool content was 2.26 ppm, the alpha-terpineol content was 1.62 ppm, and the 4-vinylphenol content was 0.81 ppm.

After the resin was used through 1 bed volume, the Brix was 4.46, the acidity was 0.51 weight percent, the reading at 325 nm was 0.005 (adjusted to 10 Brix was 0.011), the limonin content was less than 1 ppm, no hesperidin was detected, the PVG content was 0.03 ppm, the linalool content was 0.05 ppm, the alpha-terpineol content was 0.06 ppm, and no 4-vinylphenol was detected, and the terpin-4-ol content was 0.17 ppm.

After the resin was used through 12 bed volumes, the Brix was 4.89, the reading at 325 nm was 0.797 (adjusted to 10 Brix was 1.630), no limonin or hesperidin were detected, the PVG content was 1.35 ppm, the linalool content was 0.08 ppm, the alpha-terpineol content was 0.11 ppm, and the 4-vinylphenol content was 0.05 ppm.

After the resin was used through 25 bed volumes, the Brix was 4.99, the reading at 325 nm was 1.466 (adjusted to 10 Brix was 2.938), no limonin was detected, the hesperidin content was 38 ppm, the PVG content was 4.56 ppm, the linalool content was 0.10 ppm, the alpha-terpineol content was 0.25 ppm, and the 4-vinylphenol content was 0.35 ppm.

After the resin was used through 1-25 bed volumes, the composite values were as follows: Brix was 4.79, the acidity was 0.60, the reading at 325 nm was 0.863 (adjusted to Brix 10 was 1.802), no limonin was detected, the hesperidin content was 3 ppm, the PVG content was 1.70 ppm, the linalool content was 0.07 ppm, the alpha-terpineol content was 0.11 ppm, and the 4-vinylphenol content was 0.04 ppm.

EXAMPLE 19

Orange peel juice was prepared from peels discarded by commercial orange juice extractors. The peels were shredded and pressed, solids were separated, and the resulting raw peel juice was subjected to filtration and passage through Alimentech P495 resin. In addition, the juice was pasteurized.

Prior to passage through the resin, the Brix was 5.09, the acidity was 0.61 weight percent, the reading at 325 nm was 1.869 (adjusted to 10 Brix was 3.672), the limonin content was 33 ppm, the hesperidin content was 262 ppm, the PVG content was 11.33 ppm, the linalool content was 2.23 ppm, the alpha-terpineol content was 1.60 ppm, and the 4-vinylphenol content was 0.85 ppm.

After the resin was used through 1 bed volume, the Brix was 4.59, the acidity was 0.57 weight percent, the reading at 325 nm was 0.019 (adjusted to 10 Brix was 0.041), no limonin or hesperidin were detected, the PVG content was 0.06 ppm, no alpha-terpineol was detected, and no 4-vinylphenol was detected.

After the resin was used through 12 bed volumes, the Brix was 4.92, the reading at 325 nm was 0.617 (adjusted to 10 Brix was 1.254), no limonin was detected, the hesperidin content was 15 ppm, the PVG content was 0.99 ppm, and the 4-vinylphenol content was 0.03 ppm.

After the resin was used through 25 bed volumes, the Brix was 5.01, the reading at 325 nm was 1.295 (adjusted to 10 Brix was 2.585), no limonin was detected, no hesperidin was detected, the PVG content was 3.90 ppm, the ethyl-3-hydroxyhexanoate content was 0.09 ppm, and the 4-vinylphenol content was 0.31 ppm.

After the resin was used through 1-25 bed volumes, the composite values were as follows: Brix was 4.90, the acidity was 0.60, the reading at 325 nm was 0.684 (adjusted to Brix 10 was 1.396), no limonin was detected, no hesperidin was detected, the PVG content was 1.39 ppm, no linalool was detected, and the 4-vinylphenol content was 0.03 ppm.

EXAMPLE 20

A peel juice concentrate is prepared beginning with peel cup and pulp byproduct from commercial citrus juice extraction. This is shredded and water is added at a ratio of 1:1, together with citric acid to lower the pH from about 5.0 exhibited by the shredded peel and water slurry. The slurry is thoroughly mixed and passed through a commercial-scale juice production finisher, followed by flowing to a second stage mixer to which citric acid is added. This then flows to another finisher for recycling back to the first stage mixer. After mixing and finishing through these three stages, a rudimentary peel juice is prepared, such having pH of about 3.9.

The rudimentary peel juice flows to a decanter centrifuge for reduction of suspended solids. This then flows to an apparatus for oil reduction. Pectinase then is added at 26 ppm, followed by pasteurization at conventional temperatures in order to provide a pasteurized raw citrus peel juice.

The pasteurized raw citrus peel juice is subjected to 3-stage microfiltration and a retentate is formed, as is a permeate. The permeate is subjected to debittering with ion exchange resin and passed to a blending tank. 4 weight percent of the retentate from the microfiltration unit is also passed into the blending tank as an add-back to the thus produced clarified and debittered not-from-concentrate peel juice. This peel juice then is subjected to evaporation in order to prepare a concentrated peel juice.

EXAMPLE 21

Citric peel is combined with water and pectinase at 65-70° F. for about 15 minutes. The resulting slurry is subjected to pressing, the pressed peel solids being residue for a livestock feed mill. The liquid flow from the press is centrifuged, and peel oil is collected separately from a heavy phase sludge. The resulting raw peel juice is at a Brix of about 8° and has a total solids of 10 to 15 percent. This raw peel juice is subjected to heating at 120° F. The heated raw peel juice is fed at 100 gallons per minute into a microfiltration unit of 10×CF and at 120° F. Diafiltration is carried out with water at two times the retentate volume, the flow being at 20 gallons per minute. From this microfiltration unit, the retenate comprises 10 percent of the feed, the retentate of flow being at 10 gallons per minute. The permeate leaves the microfiltration unit at 110 gallons per minute and comprises 90 percent of the feed into the microfiltration unit.

The permeate is a clarified peel juice having virtually no pulp and a Brix of about 10°. This clarified peel juice is cooled through heat exchangers down to about 40° F. (about 4.5° C.). The flow out of the heat exchangers remains at about 110 gallons per minute for flowing at this rate into an ion exchange resin debittering column assembly comprising a plurality of resin columns. Exit from the columns is at 83 gallons per minute, and this flows into a deacidifing assembly comprising a plurality of resin columns. The remainder of the flow from the debittering column is adjusted to provide a debittered and deacidified clarified peel juice when combined with the flow out of the deacidifing unit. The resulting clarified, debittered and deacidified peel juice has an acidity of 0.6. Pasteurization is carried out. 5 gallons per minute of pasteurized retentate from the microfiltration unit and 110 gallons per minute of the clarified, debittered and deacidified peel juice having the 0.6 percent acidity are blended together in order to provide a flow of 115 gallons per minute of filler peel juice at a Brix of about 10°. This is evaporated and stored as a concentrated peel juice having a Brix level of about 58°.

EXAMPLE 22

Orange peel byproduct is shredded and combined with water at a ratio of 1:1. 100 pounds of this peel slurry was run through a soft press as generally discussed herein. After pressing, the rudimentary peel juice weight is 84 pounds. This juice has 8.8 pounds of retractable solids and 0.5 pound of insoluble solids.

Another 100 pounds of the orange peel slurry is run through a VP hard press. 88 pounds of the rudimentary peel juice is collected. This contained 8.9 pounds of retractable solids and 2.9 pounds of insoluble solids.

A further 100 pounds of the peel juice slurry is run through a BP hard press. The rudimentary juice out of the press weighs 94 pounds, of which 10 pounds is retractable solids and 1.3 pounds is insoluble solids.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A process for providing a citrus juice product including a peel juice component, comprising:

shredding peel byproduct from extraction of citrus juice from citrus fruit, said shredding providing peel material;

combining said peel material with water at a weight ratio of from about 1:2 to 2:1 of peel material to water in order to provide a peel liquid slurry;

pressing said peel liquid slurry to produce a spent peel cake and a raw peel juice, the raw peel juice comprising water, sugars, flavor components and oils;

subjecting said raw peel juice to microfiltration to form a retentate of peel solids and a permeate of clarified peel juice;

debittering said clarified peel juice to form a refined peel juice, said debittering reducing the level of a naturally occurring component which detracts from the quality of said clarified peel juice; and blending said refined peel juice with a citrus juice source other then said refined peel juice in order to provide a citrus juice product.

2. The process of claim 1, wherein said shredding results in peel material having nominal size of between about 1/16 and about 3/4 inch.

3. The process of claim 1, further including adding food grade acid into the peel liquid slurry to adjust the pH of the slurry to not greater than about 4.0.

4. The process of claim 1, wherein said extracting is carried out in multiple stages through separators having differing levels of separation aggressiveness.

5. The process of claim 1, wherein said extracting is carried at a temperature between about 65° F. and about 120° F. (about 18° C. and about 50° C.).

6. The process of claim 1, further including adding an enzyme into one or both of the peel liquid slurry and the raw peel juice, followed by pasteurizing the raw peel juice to which enzyme is added.

7. The process of claim 1, wherein said microfiltration incorporates a membrane having pores with a size between about 0.1 micron and about 1.0 micron.

8. The process of claim 1, wherein said microfiltration includes diafiltration to the filtration media of a microfiltration unit which carries out said microfiltration.

9. The process of claim 1, further including evaporating said refined peel juice and wherein a retentate from said microfiltration is added to the refined peel juice promptly before beginning said evaporation.

10. The process of claim 1, wherein said debittering contacts the clarified peel juice with an adsorption resin.

11. The process of claim 10, wherein said adsorption resin is a styrene divinylbenzene resin.

12. The process of claim 1, wherein said naturally occurring component which detracts from the quality of the peel juice is selected from the group consisting of a limonoid, a flavonoid, a carotenoid, and a polyphenolic compound.

13. The process of claim 1, wherein said peel juice originates from citrus sources, and said naturally occurring component which detracts from the quality of the peel juice is selected from the group consisting of naringin, limonin, hesperidin, para-vinylguaiacol, nauritin, sinensetin, nobiletin, heptamethoxyflavone, tangeritin, para-vinylguaicol, neohesperidin (hesperidin glucoside), hesperitin, and combinations thereof which, after said passing of the clarified peel juice through the adsorption resin, is at a level of not greater than about 200 ppm for naringin, not greater than about 20 ppm for limonin, narirutin, sinensetin, nobiletin, heptamethoxyflavone, tangeritin, neohesperidin (hesperidin glucoside) and hesperitin, of not greater than about 70 ppm for hesperidin, of not greater than about 1 ppm for para-vinylguaiacol of the refined peel juice.

14. The process of claim 1, wherein said naturally occurring component which detracts from the quality of the peel juice is a polyphenol which, after said passing of the clarified peel juice through the adsorption resin, gives a gas chromatograph spectrophotomeric reading at 325 nm of not greater than about 2 at 23° C. for up to 20 composite bed volumes of said resin.

15. The process of claim 1, wherein said naturally occurring component which detracts from the quality of the peel juice is a polyphenol which, after said passing of the clarified peel juice through the adsorption resin, gives a gas chromatograph spectrophotomeric reading at 325 nm of not greater than about 0.2 at 23° C. for the first bed volume of said resin after its complete regeneration.

16. The process of claim 1, wherein said naturally occurring component which detracts from the quality of the peel juice is a para-vinylguaiacol, and wherein said reduced level of para-vinylguaiacol is not greater than about 0.1 ppm of the enhanced fruit juice.

17. The process of claim 1, further including deacidifying the clarified peel juice to an acidity of not greater than about 0.9 weight percent.

18. A process for providing a refined citrus peel juice product, comprising:

shredding peel byproduct from extraction of citrus juice from citrus fruit, said shredding providing peel material;

combining said peel material with water at a weight ratio of from about 1:2 to 2:1 of peel material to water in order to provide a peel liquid slurry;

pressing said peel liquid slurry to produce a spent peel cake and a raw peel juice, the raw peel juice comprising water , sugars, flavor components and oils;

subjecting said raw peel juice to microfiltration to form a retentate of peel solids and a permeate of clarified peel juice;

debittering said clarified peel juice to form a refined peel juice, said debittering reducing the level of a component that detracts from a desirable quality of said clarified peel juice; and collecting the thus clarified and debittered juice as a refined citrus peel juice.

19. The process of claim 18, further including adding an enzyme into the raw peel juice, followed by pasteurizing the raw peel juice.

20. The process of claim 18, wherein said microfiltration incorporates a membrane having pores with a size between about 0.3 and about 0.7 micron.

21. The process of claim 18, wherein said refined citrus peel juice is subjected to evaporation so as to provide a concentrated refined citrus peel juice.

22. A refined citrus peel juice made according to the process of claim 18.

23. The citrus peel juice according to claim 22, further including deacidifying the clarified peel juice to provide the citrus peel juice with an acidity of not greater than about 0.9 weight percent.

24. The citrus peel juice according to claim 22, wherein said refined citrus peel juice is a filler juice.

25. The citrus peel juice according to claim 22, wherein said refined peel juice is from grapefruit peel byproduct, and said refined grapefruit peel juice is not organoleptically recognized as grapefruit juice within said juice product.

26. The citrus peel juice according to claim 22, further including evaporating said refined citrus peel juice, and said refined citrus peel juice product a concentrated citrus peel juice.

27. A juice product including a citrus peel juice, said juice product being prepared by a process comprising:

shredding peel byproduct from extraction of citrus juice from citrus fruit, said shredding providing peel material;

combining said peel material with water at a weight ratio of from about 1:2 to 2:1 of peel material to water in order to provide a peel liquid slurry;

extracting said peel liquid slurry into spent peel cake and raw peel juice, the raw peel juice comprising water, sugars, flavor components and oils;

subjecting said raw peel juice to microfiltration to form a retentate of peel solids and a permeate of clarified peel juice;

debittering said clarified peel juice to form a refined peel juice, said debittering reducing the level of a naturally occurring component which detracts from the quality of said clarified peel juice; and blending said refined peel juice with a citrus juice source other then said refined peel juice in order to provide a citrus juice product.

28. The juice product according to claim 27, wherein said raw peel juice is at a Brix of between about 4° and about 8°.

29. The juice product according to claim 27, wherein said refined peel juice is from grapefruit peel byproduct, and said refined grapefruit peel juice is not organoleptically recognized as grapefruit juice within said juice product.

* * * * *